(12) United States Patent
Rager et al.

(10) Patent No.: US 8,412,270 B2
(45) Date of Patent: Apr. 2, 2013

(54) USING NETWORK AUTHENTICATION TO COUNTER SUBSCRIBER IDENTITY MODULE CARD MAN-IN-THE-MIDDLE SUBSIDY LOCK ATTACK

(75) Inventors: Kent Rager, Gurnee, IL (US); Joel Voss, Elkhorn, WI (US)

(73) Assignee: Motorola Mobility LLC, Libertyville, IL (US)

( * ) Notice: Subject to any disclaimer, the term of this patent is extended or adjusted under 35 U.S.C. 154(b) by 1259 days.

(21) Appl. No.: 12/188,785

(22) Filed: Aug. 8, 2008

(65) Prior Publication Data
US 2010/0035577 A1 Feb. 11, 2010

(51) Int. Cl.
*H04M 1/00* (2006.01)
(52) U.S. Cl. ............... 455/558; 455/411; 455/550.1; 455/418
(58) Field of Classification Search ......... 455/558, 455/410–411, 418–420, 550.1
See application file for complete search history.

(56) References Cited

U.S. PATENT DOCUMENTS

| 6,321,079 | B1 * | 11/2001 | Cooper | 455/411 |
|---|---|---|---|---|
| 6,490,463 | B1 * | 12/2002 | Portalier et al. | 455/557 |
| 6,829,492 | B2 * | 12/2004 | Aerrabotu | 455/565 |
| 6,836,654 | B2 * | 12/2004 | Decotignie | 455/410 |
| 7,389,123 | B2 * | 6/2008 | Rydgren et al. | 455/550.1 |
| 7,840,234 | B2 * | 11/2010 | Chan | 455/558 |
| 7,873,382 | B2 * | 1/2011 | Rydgren et al. | 455/550.1 |
| 7,886,355 | B2 * | 2/2011 | Rager et al. | 726/21 |
| 8,032,181 | B2 * | 10/2011 | Hauck et al. | 455/558 |
| 8,171,527 | B2 * | 5/2012 | Qiu et al. | 726/3 |
| 8,290,474 | B2 * | 10/2012 | Norgaard et al. | 455/410 |
| 8,320,880 | B2 * | 11/2012 | Fok et al. | 455/411 |
| 2005/0045717 | A1 * | 3/2005 | Rager et al. | 235/383 |
| 2009/0305668 | A1 * | 12/2009 | Ahn et al. | 455/410 |

FOREIGN PATENT DOCUMENTS

WO   WO2005051018 A1   6/2006

OTHER PUBLICATIONS

OMTP Hardware Working Group; OMTP Hardware Requirements and Defragmentation; Trusted Environment; Version 1, Release 1, Mar. 27, 2006.
Retis Consulting; SIM Proxy Security Analysis; Jun. 6, 2008.

* cited by examiner

*Primary Examiner* — Sharad Rampuria (57) ABSTRACT

A method, telecommunication apparatus, and electronic device for securely using a subscriber identity module are disclosed. A secure memory 308 may store a secure international mobile subscriber identity. A subscriber identity module interface 312 may receive an unlocking international mobile subscriber identity. A processor 304 may erase a cache temporary mobile subscriber identity if the unlocking international mobile subscriber identity does not match the secure international mobile subscriber identity.

13 Claims, 7 Drawing Sheets

700
Figure 7

USING NETWORK AUTHENTICATION TO COUNTER SUBSCRIBER IDENTITY MODULE CARD MAN-IN-THE-MIDDLE SUBSIDY LOCK ATTACK

1. FIELD OF THE INVENTION

The present invention relates to a method and system for securely using a subscriber identity module. The present invention further relates to preventing circumvention by a man-in-the-middle circuit.

2. INTRODUCTION

A user may easily switch between mobile telephones through the use of a subscriber identity module (SIM). A SIM stores an identifying number of a home network and a subscriber within that home network collectively called an international mobile subscriber identity (IMSI). The SIM may optionally store other information about a user such as the user's name, telephone number, address book, and other identifying features. The SIM may be an electronic memory device or other means for storing information. It may be mounted in a communication device, removably carried by the communication device, or coupled to the communication device by wired or wireless a communication link. For example, the SIM may be a thin card that is carried with a mobile telephone under a battery or behind a battery door. The SIM may not necessarily have a secure authenticated channel through which the mobile telephone may read the IMSI from the SIM. Thus, the mobile telephone may not be entirely sure that the value read is the value the SIM sent.

As many mobile telephones are subsidized by the network providers, the mobile telephones may be designed to only be allowed to work with certain SIM cards. One method may be to use a mobile telephone with a subsidy lock. A subsidy lock may deny access to the telephone if the SIM fails to provide a specified IMSI.

One method of circumventing the subsidy lock may be to use a man-in-the-middle circuit card. The man-in-the-middle circuit card may be placed over a SIM card and interfere with the interactions between the SIM card and the telephone. The man-in-the-middle circuit card may intercept the IMSI being sent to the telephone and replace the IMSI with a test IMSI for the brand of telephone used. Once the subsidy lock has been circumvented, the proper IMSI may be allowed through when dealing with the network.

The man-in-the-middle circuit card may be aided by the use of a temporary mobile subscriber identity (TMSI). Once an IMSI has been provided to the network, the network may provide the user device with a TMSI to increase security. While an IMSI is by necessity unsecured, so that all networks may use the IMSI to identify the user upon first contact, the TMSI may be used to maintain privacy of the identity of the subscriber since the TMSI has an association to a particular subscriber that is tracked in the network. The mobile telephone may store the TMSI in the cache for use each time the network is accessed.

SUMMARY OF THE INVENTION

A method, telecommunication apparatus, and electronic device for securely using a subscriber identity module are disclosed. A secure memory may store a secure international mobile subscriber identity. A subscriber identity module interface may receive an unlocking international mobile subscriber identity. A processor may erase a cache temporary mobile subscriber identity if the unlocking international mobile subscriber identity does not match the secure international mobile subscriber identity.

BRIEF DESCRIPTION OF THE DRAWINGS

Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention comprises a variety of embodiments, such as a method, an apparatus, and an electronic device, and other embodiments that relate to the basic concepts of the invention. The electronic device may be any manner of computer, mobile device, or wireless communication device.

A method, telecommunication apparatus, and electronic device for securely using a subscriber identity module are disclosed. A secure memory may store a secure international mobile subscriber identity. A subscriber identity module interface may receive an unlocking international mobile subscriber identity. A processor may erase a cache temporary mobile subscriber identity if the unlocking international mobile subscriber identity does not match the secure international mobile subscriber identity.

One way of foiling the man-in-the-middle circuit card is by checking the international mobile subscriber identity (IMSI) received from the subscriber identity module (SIM) with the network. This check may not always be performed. After initial contact with the network, a temporary mobile subscriber identity (TMSI) may be used to contact the network while protecting the privacy of the subscriber. Checking the IMSI with the network any time a mobile handset seeks to access the network may negate any privacy advantage received by using the TMSI. A more balanced approach may check the IMSI with the network any time the IMSI may seem to have been invalidated. The mobile handset may store a validated IMSI in a secure non-volatile memory to check against an IMSI used to unlock the subsidy lock. If the secure IMSI differs from the unlocking IMSI, the mobile handset may force a network check by erasing the TMSI from the cache.

Figure 1:
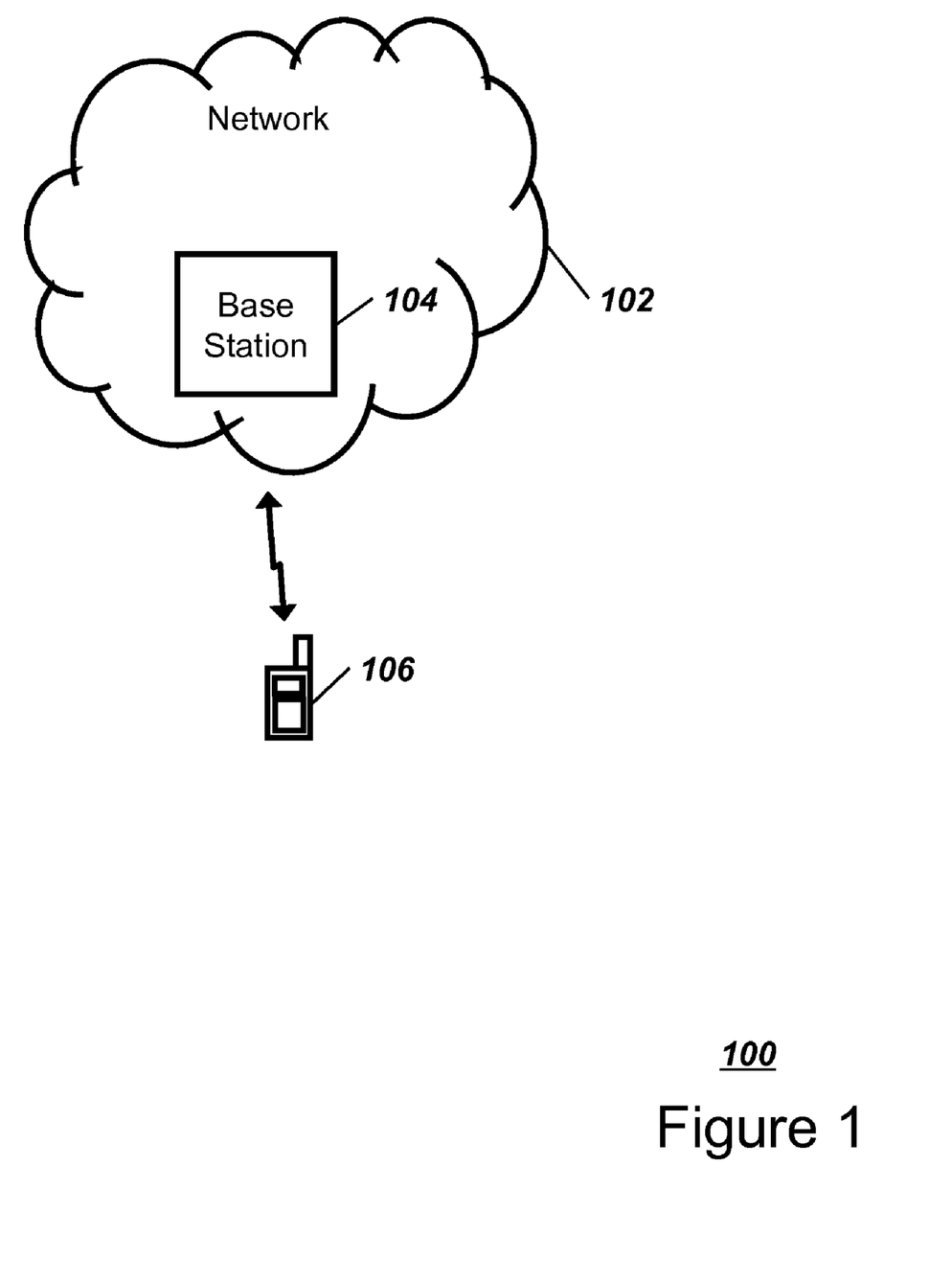
FIG. 1 illustrates one embodiment of a communication system.

FIG. 1 illustrates one embodiment of a communication system 100. The communication system 100 may include a network 102, base station 104, and a mobile device, such as a user equipment (UE) or mobile equipment (ME) 106. Various communication devices may exchange data or information through the network 102. The network 102 may be an evolved universal terrestrial radio access (E-UTRA), a Third Generation Partnership Project (3GPP) global system for mobile communication (GSM), a Universal Mobile Telecommunication System (UMTS) or other type of telecommunication network. A network entity, such as the base station 104, may connect the mobile device 106 to the network 102. For one embodiment, the base station 104 may be a distributed set of servers in the network. The mobile device 106 may be one of several types of handheld or mobile devices, such as, a mobile phone, a laptop, or a personal digital assistant (PDA). For one embodiment, the mobile device 106 may be a WiFi® capable device, a WiMax® capable device, or other wireless devices.

Figure 2:
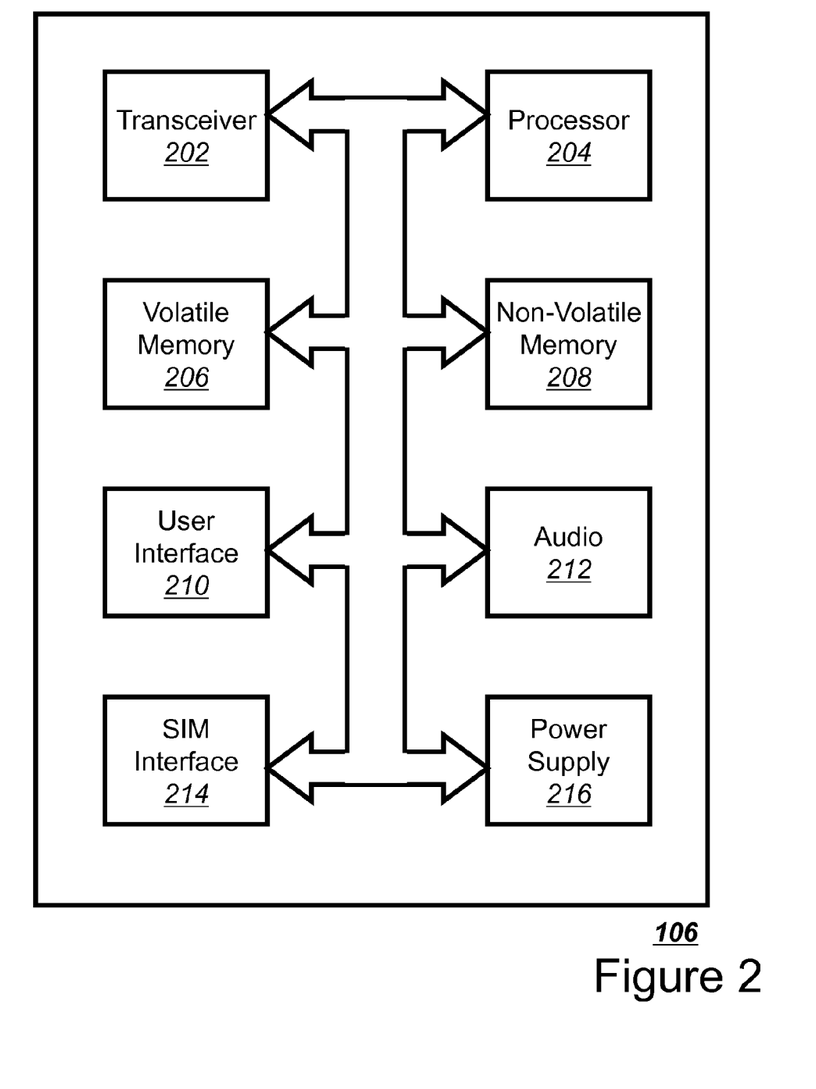
FIG. 2 illustrates a possible configuration of a computing system to act as a mobile handset.

FIG. 2 illustrates in a block diagram one embodiment of a computing device 106 that may be used as a mobile device or a mobile handset. The computing device 106 may access the information or data stored in a network 102. The computing device 106 may support one or more applications for performing various communications with the network 102. The computing device 106 may implement any operating system, such as Windows or UNIX, for example. Client and server software may be written in any programming language, such as C, C++, Java or Visual Basic, for example. The computing device 106 may be a mobile phone, a laptop, a personal digital assistant (PDA), or other portable device. For some embodiments of the present invention, the computing device 106 may be a WiFi capable device, which may be used to access the network for data or by voice using voice over internet protocol (VOIP). The computing device 106 may include a network interface 202, such as a transceiver, to send and receive data over the network.

The computing device 106 may include a controller or processor 204 that executes stored programs. The controller or processor 204 may be any programmed processor known to one of skill in the art. However, the decision support method may also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, any device or devices capable of implementing the decision support method as described herein can be used to implement the decision support system functions of this invention.

The computing device 106 may also include a volatile memory 206 and a non-volatile memory 208 to be used by the processor 204. The volatile 206 and nonvolatile data storage 208 may include one or more electrical, magnetic or optical memories such as a random access memory (RAM), cache, hard drive, or other memory device. The memory may have a cache to speed access to specific data. The memory may also be connected to a compact disc-read only memory (CD-ROM), digital video disc-read only memory (DVD-ROM), DVD read write input, tape drive or other removable memory device that allows media content to be directly uploaded into the system.

The computing device 106 may include a user input interface 210 that may comprise elements such as a keypad, display, touch screen, or any other device that accepts input. The computing device 106 may also include a user output device that may comprise a display screen and an audio interface 212 that may comprise elements such as a microphone, earphone, and speaker. A SIM may be attached to the computing device 106 via a SIM interface 214. Finally, the computing device 106 may include a power supply 216.

Client software and databases may be accessed by the controller or processor 204 from the memory, and may include, for example, database applications, word processing applications, video processing applications as well as components that embody the decision support functionality of the present invention. The user access data may be stored in either a database accessible through a database interface or in the memory. The computing device 106 may implement any operating system, such as Windows or UNIX, for example. Client and server software may be written in any programming language, such as C, C++, Java or Visual Basic, for example.

Figure 3:
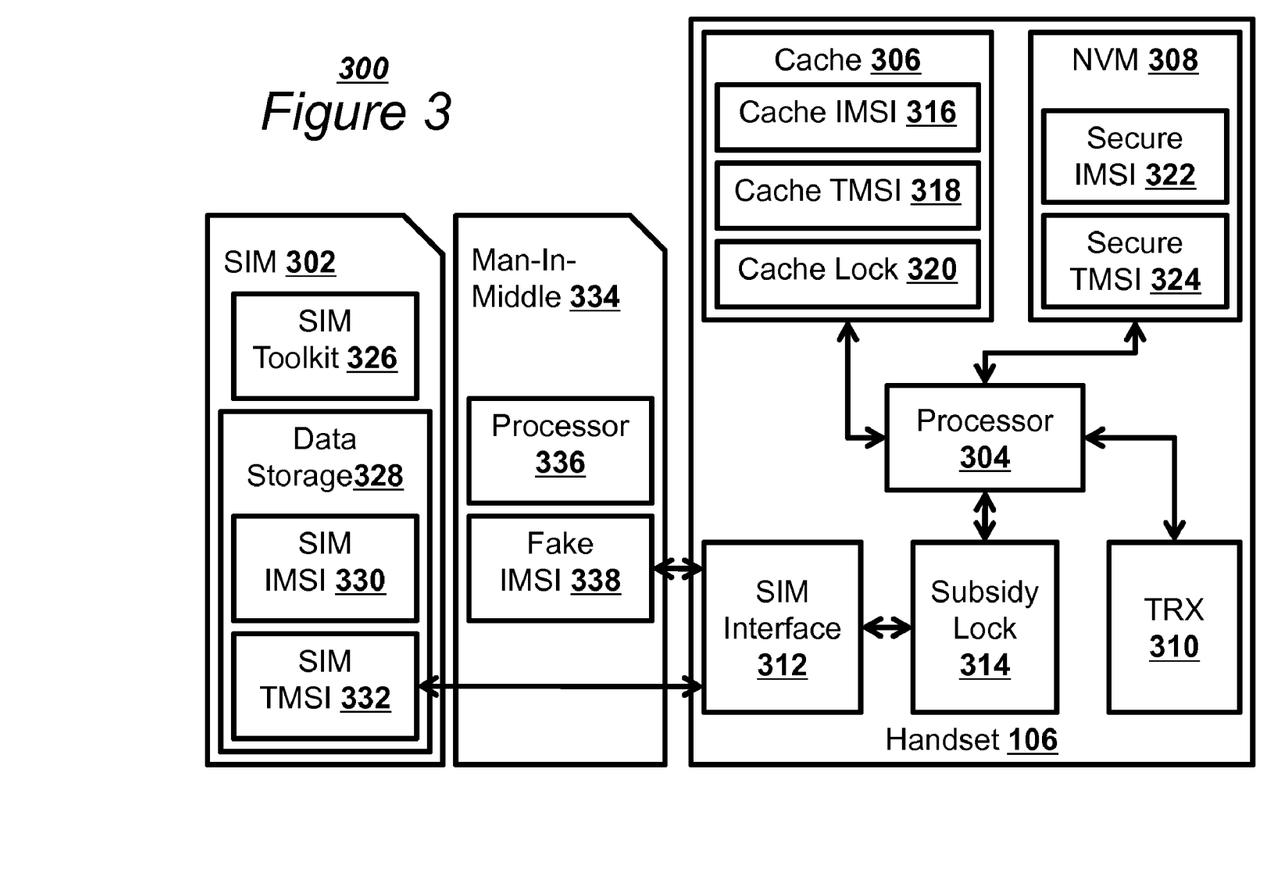
FIG. 3 illustrates, a block diagram, one embodiment of the interaction between a mobile handset and a subscriber identity module.

FIG. 3 illustrates, a block diagram, one embodiment of the interaction 300 between a mobile handset 106 and a SIM 302. The mobile handset 106 may have a processor 304, a cache 306 for storing data used by the processor 304, a secure non-volatile memory (NVM) 308, a transceiver (TRX) 310 for connecting to a network 102 base station 104, and a SIM interface 312 for interacting with the SIM 302. The secure NVM 308 may be integrity protected to keep data in the NVM 308 from being corrupted. A subsidy lock 314 may control whether the mobile handset 106 may operate with that particular SIM 302. The subsidy lock 314 may be a separate firmware module or a function operated by the processor 304.

The cache 306 may store cache copies of the IMSI 316, the TMSI 318, and other data. The cache 306 may store the TMSI 318 as a location information (LOCI) file. The cache 306 may have a cache lock 320, or a flag that indicates whether the cache 306 may be refreshed by the SIM 302. The secure NVM 308 may store secure copies of the IMSI 322, the TMSI 324, and other necessary data.

The SIM 302 may have modest functionality. The SIM 302 may have a SIM toolkit 326 for executing identity related functions, such as requesting the cache 306 of the mobile handset 106 refresh the data stored therein, and update the data stored on the SIM 302. The SIM 306 may have a data storage 328, such as an NVM, a volatile memory, a cache or some other means of storing data. The SIM data storage 328 may store SIM copies of the IMSI 330, the TMSI 332, and other data. The SIM IMSI 330, or the unlocking IMSI 330, and the SIM TMSI 332, or unlocking TMSI 332, may be used to unlock the subsidy lock 314.

A man-in-the-middle card circuit 334 may be placed between the SIM 302 and the SIM interface 312. The man-in-the-middle card circuit 340 may have a small processor chip 336 to perform any minor functionality necessary to circumvent the subsidy lock 314. The man-in-the-middle may store a fake IMSI 338 in a small memory device. When the subsidy lock 314 requests the unlocking IMSI 330 from the SIM 302, the man-in-the-middle card 334 may intercept the request and replace the unlocking IMSI 330 with the fake IMSI 338. The fake IMSI 338 may unlock the subsidy lock 314, at which point the real SIM IMSI 330 or a stored SIM TMSI 332 or a cache IMSI 316 or cache TMSI 318 may be used to interact with the network.

Figure 4:
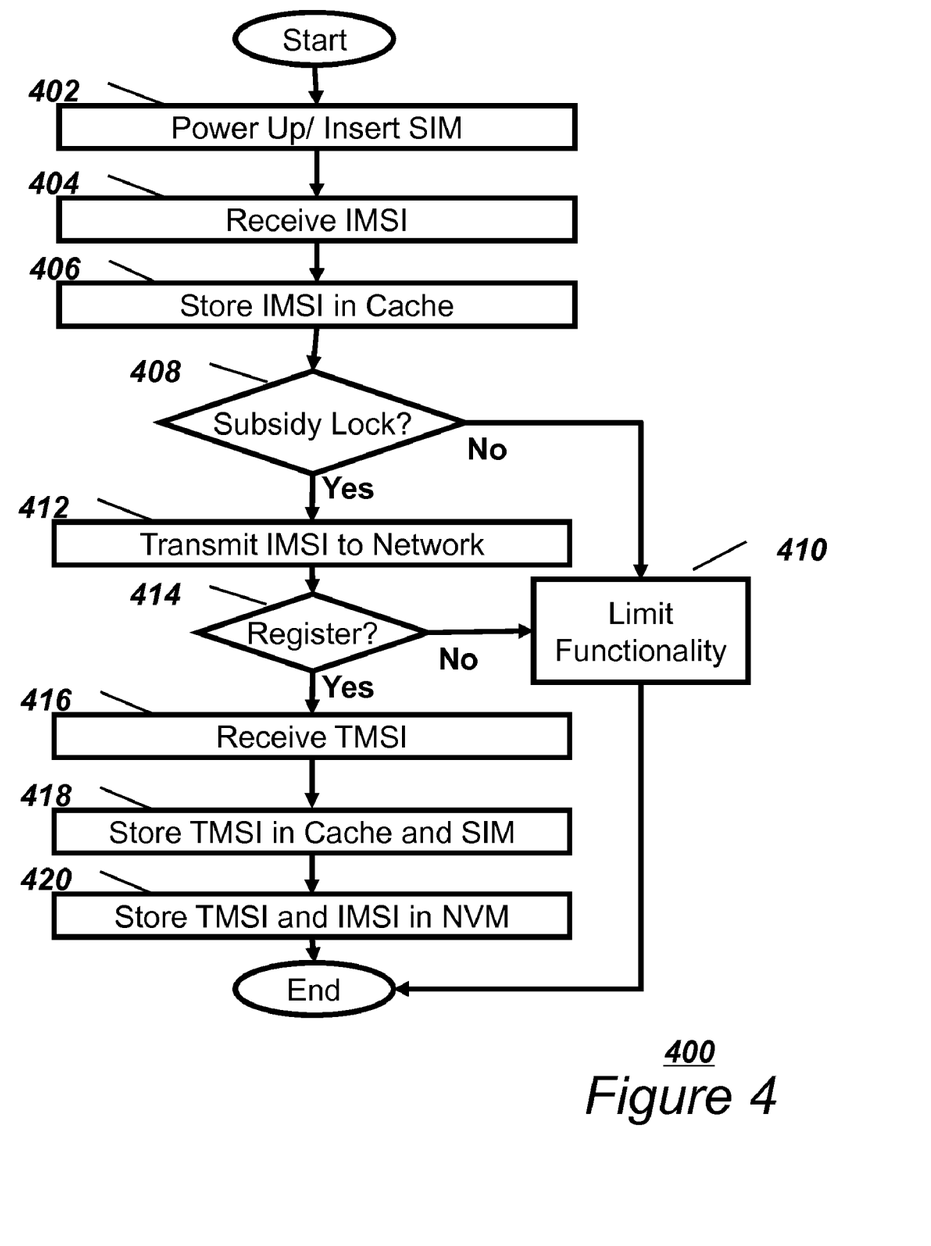
FIG. 4 illustrates, in a flowchart, one method for initially accessing the network with an international mobile subscriber identity.

FIG. 4 illustrates, in a flowchart, one method 400 for initially accessing the network 102 with an IMSI. The mobile handset 106 may power up or have a SIM inserted (Block 402). The SIM interface 312 may receive an unlocking IMSI 330 from the SIM 302 (Block 404). The cache 306 may store a copy of the unlocking IMSI 330 as a cache IMSI 316 (Block 406). If the subsidy lock 314 does not accept the unlocking IMSI 330 (Block 408), the mobile handset 106 may enter a mode limiting the functionality of the mobile handset (Block 410). The limited functionality mode may connect emergency, but prevent other call connections from being made. If the subsidy lock 314 does accept the unlocking IMSI 330 (Block 408), then the transceiver 310 may transmit the IMSI 330 to the network 102 to be registered (Block 412). If the IMSI 330 does not register successfully with the network 102 (Block 414), the mobile handset 106 may enter a limited functionality mode (Block 410). If the IMSI 330 registers successfully with the network 102 (Block 414), the transceiver 310 may receive a TMSI from the network 102 (Block 416). The mobile handset 106 may store a cache TMSI 318 in the cache 306 (Block 418). The mobile handset 106 may store a secure TMSI 324 and a secure IMSI 322 in the secure NVM 308 (Block 420).

Figure 5:
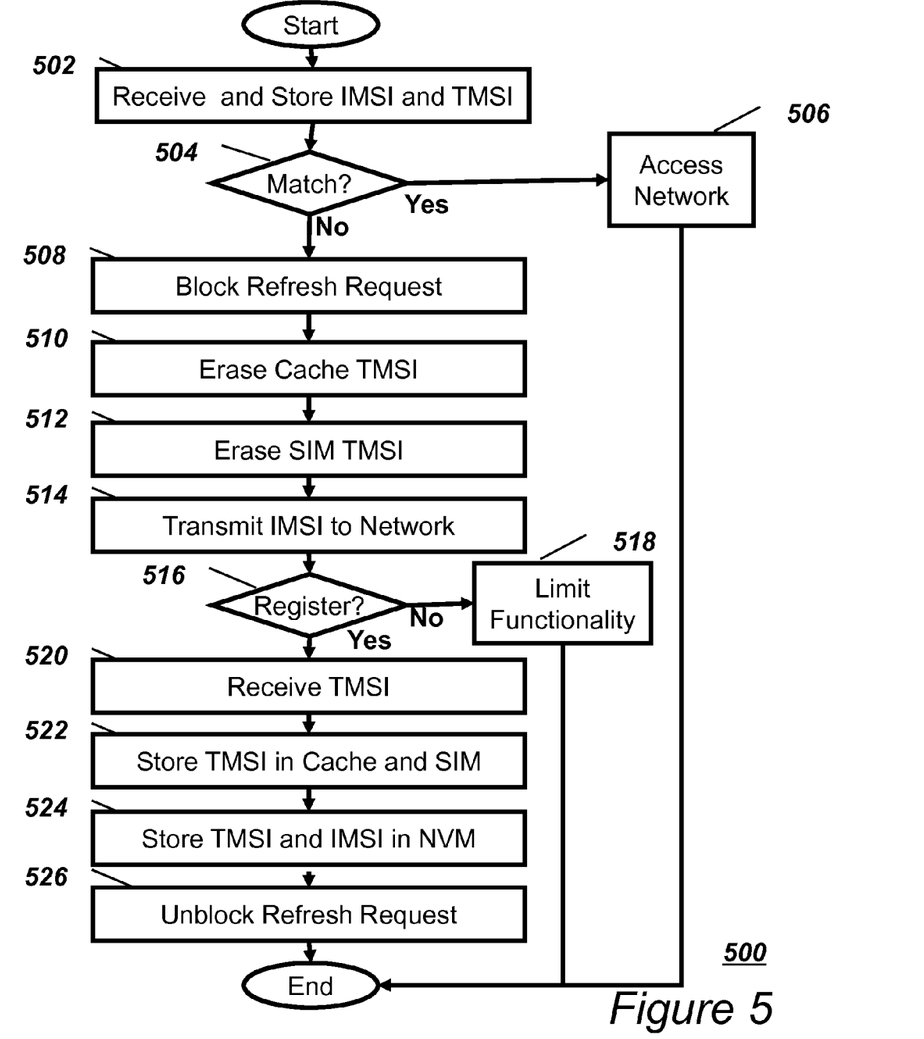
FIG. 5 illustrates, in a flowchart, one method for subsequently accessing the network with an international mobile subscriber identity.

FIG. 5 illustrates, in a flowchart, one method 500 for subsequently accessing the network 102 with an IMSI. The SIM interface 312 may receive the unlocking IMSI 330 and the unlocking TMSI 332 and store copies of them as a cache IMSI 316 and a cache TMSI 318 of the cache 306 (Block 502). If the cache IMSI 316 and the cache TMSI 318 match the secure IMSI 322 and the secure TMSI 324 (Block 504), then the mobile handset may access the network 102 by identifying the mobile handset with the TMSI (Block 506). If either the cache IMSI 316 or the cache TMSI 318 does not match the secure IMSI 322 and the secure TMSI 324 (Block 504), then the unlocking IMSI 322 may be invalid. The unlocking IMSI 326 may be invalid if the man-in-the-middle device 334 were present or if the SIM 302 had been replaced. The mobile handset 106 may be unable to distinguish between these cases. The mobile handset 106 may set the cache lock 322 to block any refresh requests by the SIM toolkit 330 of at least the cache IMSI 316 (Block 508). The mobile handset 106 may erase the cache TMSI 318 (Block 510). This action forces the mobile handset to check the validity of the unlocking IMSI 330 with the network 102 by forcing the mobile to identify itself to the network using the unlocking IMSI 330. The SIM interface 312 may transmit an order to the SIM 302 to erase the SIM TMSI 334 (Block 512). The transceiver 310 may transmit the IMSI 330 to the network 102 to be registered (Block 514). If the IMSI 330 does not register successfully with the network 102 (Block 516), the mobile handset 106 may enter a mode limiting the functionality of the mobile handset (Block 518). If the IMSI 330 registers successfully with the network 102 (Block 516), the transceiver 310 may receive a TMSI from the network 102 (Block 520). The mobile handset 106 may store a cache TMSI 318 in the cache 306 and the SIM 302 (Block 522). The mobile handset 106 may store a secure TMSI 324 and a secure IMSI 322 in the secure NVM 308 (Block 524). The mobile handset 106 may set the cache lock 322 to unblock any refresh requests by the SIM toolkit 330 (Block 526).

Figure 6:
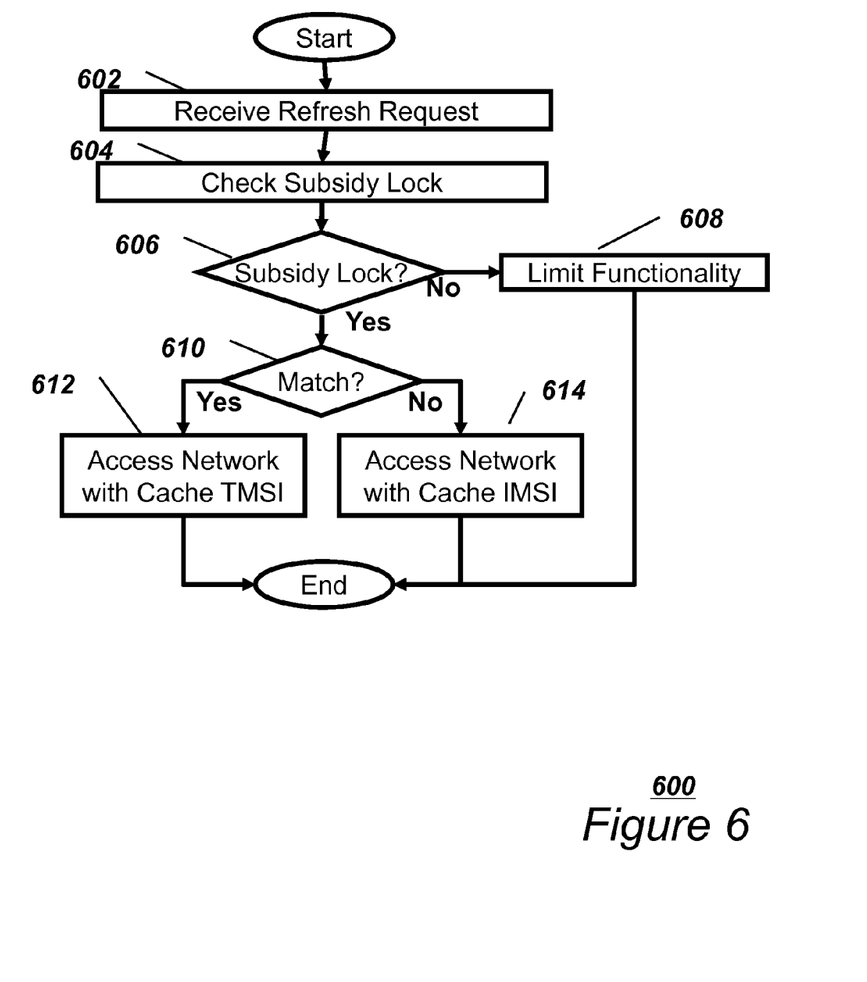
FIG. 6 illustrates, in a flowchart, one method of processing refresh requests.

FIG. 6 illustrates, in a flowchart, one method 600 of processing refresh requests. The SIM interface 312 may receive a refresh request of the cache IMSI 316 from the SIM toolkit 330 (Block 602). The mobile handset 106 may trigger a rechecking of the subsidy lock in response (Block 604). If the subsidy lock recheck fails (Block 606), the mobile handset 106 may enter the limited functionality mode (Block 608). If the subsidy lock recheck passes (Block 606) and the refreshed cache IMSI 316 matches the secure IMSI 322 (Block 610), the mobile handset 106 may access the network using the cache TMSI 318 (Block 612). If the refreshed cache IMSI 316 does not match the secure IMSI 322 (Block 610), the mobile handset 106 may access the network using the cache IMSI 316 (Block 614).

Figure 7:
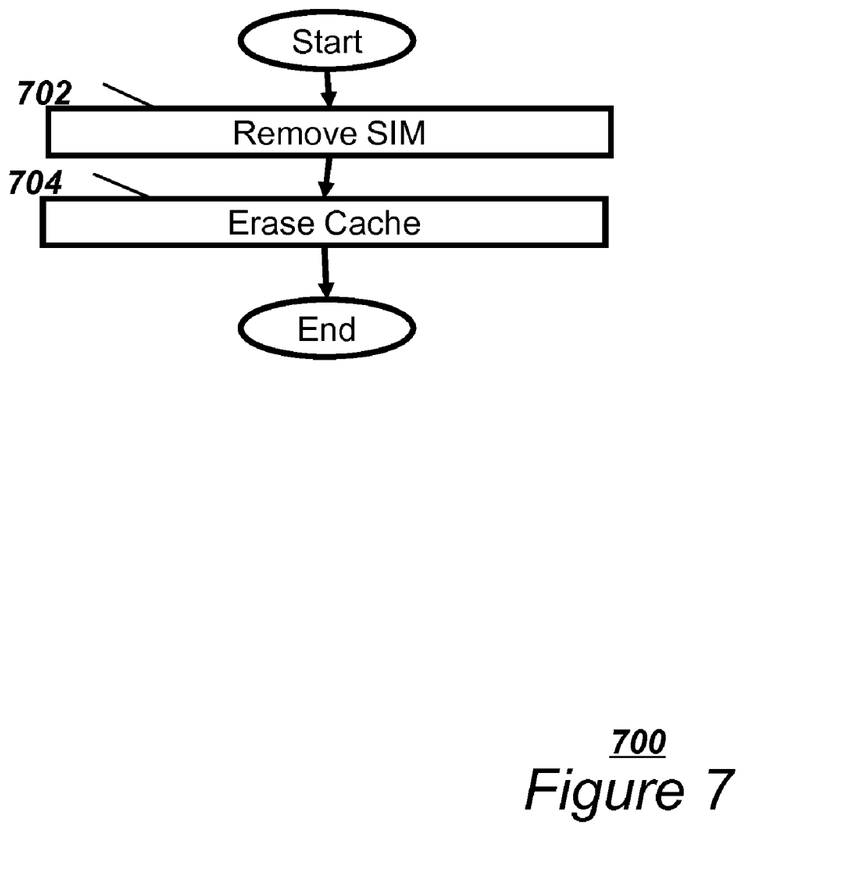
FIG. 7 illustrates, in a flowchart, one method for protecting the mobile handset.

FIG. 7 illustrates, in a flowchart, one method 700 for protecting the mobile handset 106. When the mobile handset 106 has the SIM 302 removed (Block 702), the mobile handset may erase the cache IMSI 316 and the cache TMSI 318 (Block 704).

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if any one of the large number of possible applications do not need the functionality described herein. In other words, there may be multiple instances of the electronic devices each processing the content in various possible ways.

It does not necessarily need to be one system used by all end users. Accordingly, the appended claims and their legal equivalents should only define the invention, rather than any specific examples given.

We claim:

1. A method for securely using a subscriber identity module, comprising:
   storing a secure international mobile subscriber identity in a secure memory;
   receiving an unlocking international mobile subscriber identity from a subscriber identity module; and
   erasing a cache temporary mobile subscriber identity if the unlocking international mobile subscriber identity does not match the secure international mobile subscriber identity,
   wherein the method further comprises:
   storing a secure temporary mobile subscriber identity; and
   comparing an unlocking temporary mobile subscriber identity with the secure temporary mobile subscriber identity.

2. The method of claim 1, further comprising:
   ordering the subscriber identity module to erase an unlocking temporary mobile subscriber identity.

3. The method of claim 1, further comprising:
   blocking a refresh request of a cache international mobile subscriber identity.

4. The method of claim 3, further comprising:
   validating the unlocking international mobile subscriber identity with a network; and
   unblocking the refresh request.

5. The method of claim 1, further comprising:
   checking the unlocking international mobile subscriber identity with a subsidy lock upon at least one of insertion of the subscriber identity module or power up mode.

6. The method of claim 1, further comprising:
   validating the unlocking international mobile subscriber identity with a network; and
   storing the unlocking international mobile subscriber identity as the secure international mobile subscriber identity in the secure memory.

7. A telecommunications apparatus for securely using a subscriber identity module, comprising:
   a secure memory that stores a secure international mobile subscriber identity;
   a subscriber identity module interface that receives an unlocking international mobile subscriber identity; and
   a processor that erases a cache temporary mobile subscriber identity if the unlocking international mobile subscriber identity does not match the secure international mobile subscriber identity,
   wherein the secure memory stores a secure temporary mobile subscriber identity and the processor compares an unlocking temporary mobile subscriber identity with the secure temporary mobile subscriber identity.

8. The telecommunications apparatus of claim 7, wherein the subscriber identity module interface may transmit an order to the subscriber identity module to erase an unlocking temporary mobile subscriber identity.

9. The telecommunications apparatus of claim 7, further comprising:
   a transceiver that registers the unlocking international mobile subscriber identity with a network.

10. The telecommunications apparatus of claim 9, wherein the secure memory stores the unlocking international mobile subscriber identity as the secure international mobile subscriber identity in the secure memory if the unlocking international mobile subscriber identity is validated by the network.

11. The telecommunications apparatus of claim 7, further comprising:
    a cache that blocks a refresh request of a cache international mobile subscriber identity.

12. The telecommunications apparatus of claim 11, wherein the processor unblocks the refresh request of the cache international mobile subscriber identity if the unlocking international mobile subscriber identity checks as valid with a network.

13. The telecommunications apparatus of claim 7, wherein the processor checks the unlocking international mobile subscriber identity with a subsidy lock upon at least one of insertion of the subscriber identity module, power up mode, or refresh of a cache international mobile subscriber identity.

* * * * *